Aug. 6, 1935.   E. R. LAWRENCE   2,010,270
TIRE ENCLOSURE
Filed March 5, 1934
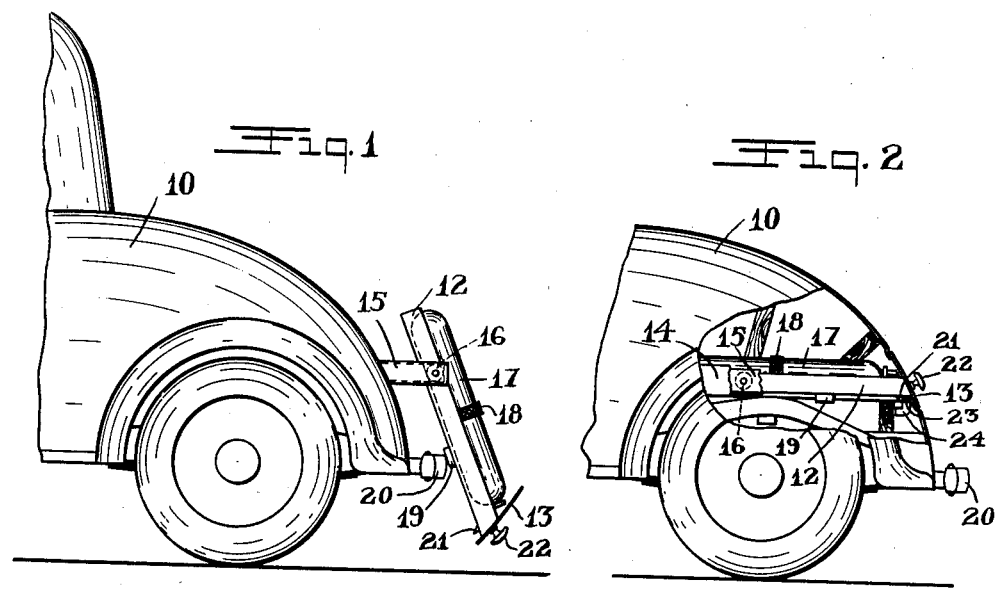
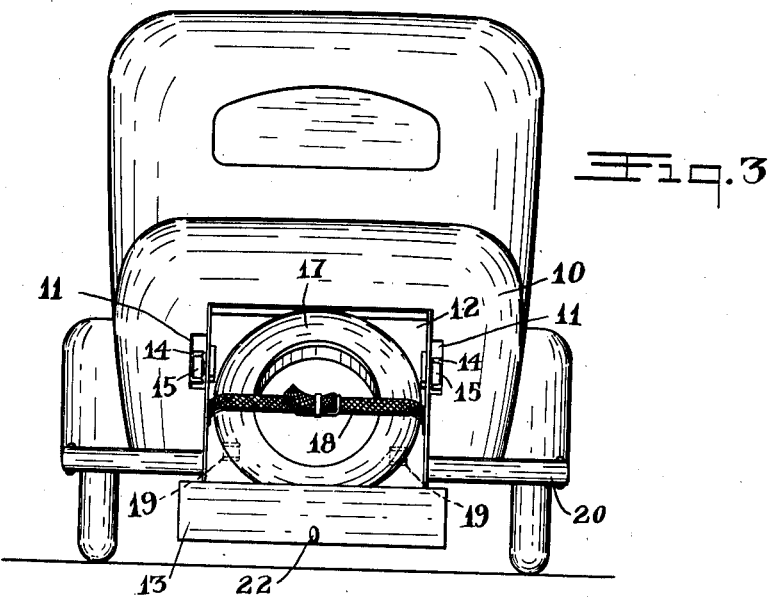
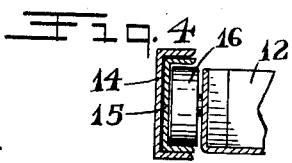
INVENTOR:
E. Rector Lawrence
BY
ATTORNEY Patented Aug. 6, 1935

2,010,270

UNITED STATES PATENT OFFICE 2,010,270

TIRE ENCLOSURE

Etna Rector Lawrence, Philadelphia, Pa.

Application March 5, 1934, Serial No. 714,111

3 Claims. (Cl. 296—37)

This invention relates to tire enclosures, and has for an object to provide improved means for carrying a tire enclosed away from light, air and the effect of other detrimental elements, and to make it readily and conveniently accessible, when necessary.

A further object of the invention is to provide in combination with a vehicle body of a tray-like member which may be moved into and out of the body carrying therewith a tire, and when at its outer limit to be tilted to make the tire carried by said tray accessible.

A further object of the invention is to provide in combination with a vehicle body, a drawer which will be enclosed wholly within the body and having an exterior surface conforming to the contour of the car body, so arranged as to be drawn entirely outside the body, and when in such outer position to tilt downwardly adjacent the ground and make the tire carried therein readily accessible.

The invention, therefore, comprises the combination with a vehicle body of an appropriate type of drawer which may be manually moved into and out of the rear of the vehicle body having a face corresponding to the surface of the body at that location, said drawer being provided with proper runways and guides to provide for withdrawing the drawer entirely from within the body to a position entirely without the body and at such outward limit to tilt downwardly so that the bottom of the tire is raised but a short distance above the ground, making it readily and easily accessible when required, and easily and conveniently returned to protecting position when replaced.

In the drawing,

Figure 1 is a view in side elevation of a fragment of a conventional vehicle body showing the tire enclosure withdrawn and tilted downward, Figure 2 is a fragmentary view in side elevation of a conventional car body, partly broken away, showing the tire enclosure in completely closed position, Figure 3 is a rear elevation of a conventional vehicle body with the tire enclosure withdrawn and tilted to operative position, Figure 4 is a transverse sectional view through the guide and runway.

Like characters of reference indicate corresponding parts throughout the several views.

The present invention may, of course, be used with a great variety of body types, but is here shown as associated with a body 10 of the "coupe" type, that being the type which lends itself most conveniently to the use of the present invention.

The rear of the body is provided with an opening 11. Within this opening 11 a drawer 12 is adapted to be inserted. The drawer 12 has a face plate 13 which corresponds to the contour of the car body. The shape of the plate 13, as shown in the drawing, is only illustrative, and shown as in accordance with the contours of the car body illustrated. It is obvious that with car bodies of other shapes the shape of this plate 13 will likewise vary.

The drawer 12 is mounted to move within and wholly without the body 10 by any approved or well known type of drawer mounting, as, for instance, the channel 14 fixed to the body, the channel 15 slidable in the channel 14 and a roller 16 carried by the drawer 12 movable in the channel 15.

The relation of the channels and drawer is such that the drawer may be shut wholly within the body, as illustrated at Figure 2, or may be withdrawn wholly without the body, as illustrated at Figures 1 and 3. The position of the roller 16 relative to the drawer is such as to permit the drawer to tilt downwardly, when wholly withdrawn from the body. As shown, the roller is mounted about one-third of the distance from the top when tilted, but it is to be understood that this kind of roller journaling may be varied as found necessary or desirable. It is the intent that when the drawer is tilted downwardly, it shall approach as nearly as convenient to the ground, so that the tire 17 carried thereby shall be conveniently available.

In the drawing, means is shown for maintaining the tire in the drawer 12. Merely a rudimentary type comprising the strap 18 is illustrated, but this is merely for illustrating purposes, and any means for maintaining the tire in that position is to be considered within the scope of the present invention. It is found desirable to provide the drawer 12 with buffers 19 which engage against the bumper 20. It is obvious that these buffers will necessarily be positioned so that they will make the proper contact with the bumpers 20 and, therefore, that the positions of these buffers will be varied in different types of installations.

Also, a latch 21 is illustrated, intended to be actuated by the handle 22, but it is shown merely for illustrating purposes, and includes any and all types of latches, locks or the like, which fancy or necessity may dictate. As so illustrated, a bar 23 is supported upon a bracket 24, so that the latch 21 engages back of this bar. This, however, will be varied in accordance with requirements or the whim of the maker. In the normal operation of the vehicle, the tire will be carried in the position shown in Figure 2, wholly enclosed within the body and, therefore, out of light, air or the effect of other detrimental elements. Where "rumble seats", trunks or other accessories are employed, the body will be varied accordingly and the position of the drawer may also be varied to coact with such other instrumentalities, but in any event will wholly enclose the tire, as stated.

When the tire is to be used, the latch is unlatched, and the drawer drawn outwardly until it entirely clears the body of the vehicle whereupon it may tilt down to the position shown at Figure 1, and will, therefore, be more readily and completely accessible when required. When the tire is replaced, the drawer will be lifted to register with the guides and pushed into place and there latched or locked in accordance with the type employed.

I claim:—

1. The combination with a vehicle body having an opening therein, of members slidable within the opening relative to the body, and a drawer pivotally mounted upon said members and thereon withdrawable from the body, said pivotal connection being disposed intermediate the extremities of the drawer to provide for tilting the drawer when so wholly withdrawn.

2. A combination with a vehicle body, of members slidable relative to the body, and a drawer pivotally mounted upon said members and thereon withdrawable from the body, said pivotal connection including pivots on the drawer intermediate the extremities thereof to provide for tilting the drawer to a position with its lower edge adjacent to the ground when so wholly withdrawn.

3. A combination with a vehicle body having an opening therein, of members slidable within the opening relative to the body, and a drawer pivotally mounted upon said members and thereon withdrawable from the body and provided with means corresponding to the surrounding body parts for closing the opening, said pivotal connection including pivots on the drawer which pivots are removed a substantial distance from the front and rear edges of the said drawer to provide for tilting the drawer to a position with its lower edge adjacent to the ground when so wholly withdrawn.

E. RECTOR LAWRENCE.